Patented Dec. 28, 1948

2,457,560

UNITED STATES PATENT OFFICE 2,457,560

PECTIC ENZYME PREPARATIONS FORTIFIED WITH PECTINESTERASE

Eugene F. Jansen and Hans Lineweaver, Berkeley, Calif., assignors to the United States of America as represented by the Secretary of Agriculture No Drawing. Application June 18, 1946,
Serial No. 677,466

1 Claim. (Cl. 195—66)

(Granted under the act of March 3, 1883, as amended April 30, 1928; 370 O. G. 757)

This application is made under the act of March 3, 1883, as amended by the act of April 30, 1928, and the invention herein described, if patented, may be manufactured and used by or for the Government of the United States of America for governmental purposes without the payment to us of any royalty thereon.

This invention relates to pectic enzyme preparations having glycosidic hydrolysis action on polygalacturonides, and has among its objects the provision of such a preparation wherein the glycosidic hydrolysis action of the preparation is increased.

Commercial pectic enzyme preparations having such glycosidic hydrolysis action are available and used for various purposes. For example, such a preparation is added to fruit juice which is then allowed to stand a suitable time and is filtered, thus to clarify the juice. In preparing juice concentrates (for example, orange juice concentrate), such a preparation is added to the juice to reduce its viscosity, thus to facilitate concentration to a higher percentage of solids content. In making wine, such preparations are used to promote clarification and to increase the juice yield prior to fermentation.

In use, the pectic enzyme preparations act to degrade the materials treated. The action, in particular in reference to the glycosidic hydrolysis action, is due to the presence of polygalacturonase.

In accordance with the present invention, it has been found, however, that esters of polygalacturonic acid are not glycosidically hydrolyzed by polygalacturonase, and that therefore the rate of glycosidic hydrolysis of polygalacturonic acid by the available pectic enzyme preparations decreases as the ester content of the acid is increased. For example, an available pectic enzyme preparation glycosidically hydrolyzed pectic acid, which is practically completely deesterified, at about 15 times the rate it hydrolyzed pectin, which is only about one third deesterified. Also, it has been found that, if the available preparations be fortified with pectinesterase, which may be obtained from higher plants which are rich in pectinesterase, it glycosidically hydrolyzes pectin at about the same rate as it hydrolyzes pectic acid.

Thus, it is evident that commercially available pectic enzyme preparations are deficient in pectinesterase, and the rate of ester hydrolysis by such preparations is too low to permit efficient use of the polygalacturonase contained therein.

In general, according to the present invention, pectic enzyme preparations are fortified with pectinesterase. Several advantages are obtained by this. Less of the preparation need be used for a given operation, thus resulting in the addition of a smaller amount of foreign materials (less dry weight of enzyme solids) to the juices to be treated, or if a larger amount of the fortified preparation be used, less time is required to carry out the operation, a saving in cost resulting in either event.

The pectinesterase is obtainable from a number of plants rich in it, for example, from orange peel, alfalfa, peas (vines and pods), and tomatoes, its preparation from oranges being given below:

Preparation of pectinesterase. Orange flavedo was extracted with dilute salt solution, buffered with borate buffer to maintain a pH of approximately 7.5. The extract was saturated to 0.6 with $(NH_4)_2SO_4$, thus to precipitate the pectinesterase which was removed and desiccated.

The pectinesterase thus obtained was used in various preparations to fortify a commercially available pectic enzyme preparation, and tests were made on a 0.5 percent pectin solution at a pH of 4 over various periods of treatment to indicate the hydrolysis, the percent hydrolysis being determined by measuring the increase in reducing value of aliquots by the Willstätter-Schudel hypoiodite method, the concentration of the pectinesterase and of the available pectic enzyme preparation being in pounds per 180 gallons of the pectin solution being treated. The results are given in the following table:

Table

| Concentration of pectinesterase | Concentration of available pectic enzyme preparations | Hydrolysis, per cent | | |
|---|---|---|---|---|
| | | 10 min. | 20 min. | 30 min. |
| 0.000 | 1 | 1.4 | 2.5 | 3.8 |
| 0.085 | 1 | 2.0 | 3.9 | 5.9 |
| 0.340 | 1 | 3.6 | 7.4 | 11.2 |
| 2.360 | 1 | 9.6 | 17.6 | 24.5 |

Flash-pasteurized pear puree was treated with pectinesterase (1 pound per 100 gallons of puree), with an available pectic enzyme preparation (1 pound per 100 gallons of puree), and with pectinesterase plus the available preparation (one pound of each per 100 gallons of puree). After five hours treatment in each case and filtration, tests were made. The filtrate from the sample treated with pectinesterase alone was very cloudy. The filtrate from the sample treated with the available preparation alone was considerably less cloudy, but had a definite reddish tinge. The filtrate from the sample treated with the combined pectinesterase and available preparation was almost clear and slightly yellow. After a 24-hour treatment, the sample treated with pectinesterase alone filtered just as slowly, and was just as cloudy as the untreated control. The sample treated with the available preparation alone filtered more rapidly, but the filtrate still possessed a reddish tinge. The sample treated with the combined pectinesterase and available preparation, however, filtered three times faster than that treated with the available preparation alone, and was clear and slightly yellow.

Having thus described the invention, what is claimed is:

The process of increasing the glycosidic hydrolysis action on polygalacturonides of a pectic enzyme preparation comprising fortifying the preparation with from about 0.085 to about 2.360 parts of pectinesterase per part of pectic enzyme preparation.

EUGENE F. JANSEN.
HANS LINEWEAVER.

REFERENCES CITED

The following references are of record in the file of this patent:

Kertesz, J. Am. Chem. Soc. 55, June (1933) p. 2605.

Clayson, "The Enzymic Degradation of Cell Wall Substances," Chemistry and Industry, Dec. 19, 1942, pp. 516, 517, 518.

Hills et al., Proceedings Institute of Food Technologists, June 1942, pp. 48 to 50.

Sumner, Enzymes, Academic Press, N. Y., (1943) pp. 57, 87, 88.

Lineweaver and Ballou, Arch. of Biochem, vol. 6, (1945) page 373.

McCulloch and Kertesz, J. Biol. Chem. 160 (Sept. 1945), pp. 149 to 154.